United States Patent [19]
Roeseler et al.

[11] Patent Number: 5,366,182
[45] Date of Patent: Nov. 22, 1994

[54] KITESKI

[76] Inventors: William G. Roeseler, 2101 Salina, Wichita, Kans. 97203; Cory Roeseler, 555 Santa Fe St. Ste. E, San Diego, Calif. 92109

[21] Appl. No.: 160,434

[22] Filed: Nov. 30, 1993

[51] Int. Cl.$^5$ .............................................. B64C 31/06
[52] U.S. Cl. .................................. 244/155 R; 114/102; 244/155 A; 280/810
[58] Field of Search ...................... 244/155 R, 155 A; 280/810; 114/39.2, 102, 103

[56] References Cited

U.S. PATENT DOCUMENTS

| | | | |
|---|---|---|---|
| 2,839,259 | 6/1958 | Mayne | 244/155 A |
| 3,355,129 | 11/1967 | Kinsey | 244/155 A |
| 3,421,722 | 1/1969 | May et al. | 244/155 A |
| 4,127,247 | 11/1978 | Strasilla | 280/810 |
| 4,708,078 | 11/1987 | Legaignoux et al. | 244/145 |
| 5,148,761 | 9/1992 | Winner | 114/39.2 |

OTHER PUBLICATIONS

William Werme, *Stacking Heavy Numbers in the Windy City*, 1986, pp. 64–67 (Kite Lines).

*Primary Examiner*—Michael S. Huppert
*Assistant Examiner*—Anne E. Bidwell
*Attorney, Agent, or Firm*—Ralph S. Branscomb

[57] ABSTRACT

A wind powered system utilizes a free-flying airfoil tethered to a conveyance device such as a water ski, a skegged hull slab or a wheeled land vehicle which either defines or inherently has tracking means defining a preferred traverse vector across an underlying surface. The tractive force of the airfoil is applied at the center of lateral resistance of the conveyance device such that there is no destabilizing moment caused by the airfoil, thereby removing an artificial limit on the sail area that is imposed upon fixed mast sailing craft. A control bar provides a mount for a tether reel which enables the conveyance device, when same is a kite, to be launched from the water without requiring the assistance of a boat.

18 Claims, 2 Drawing Sheets

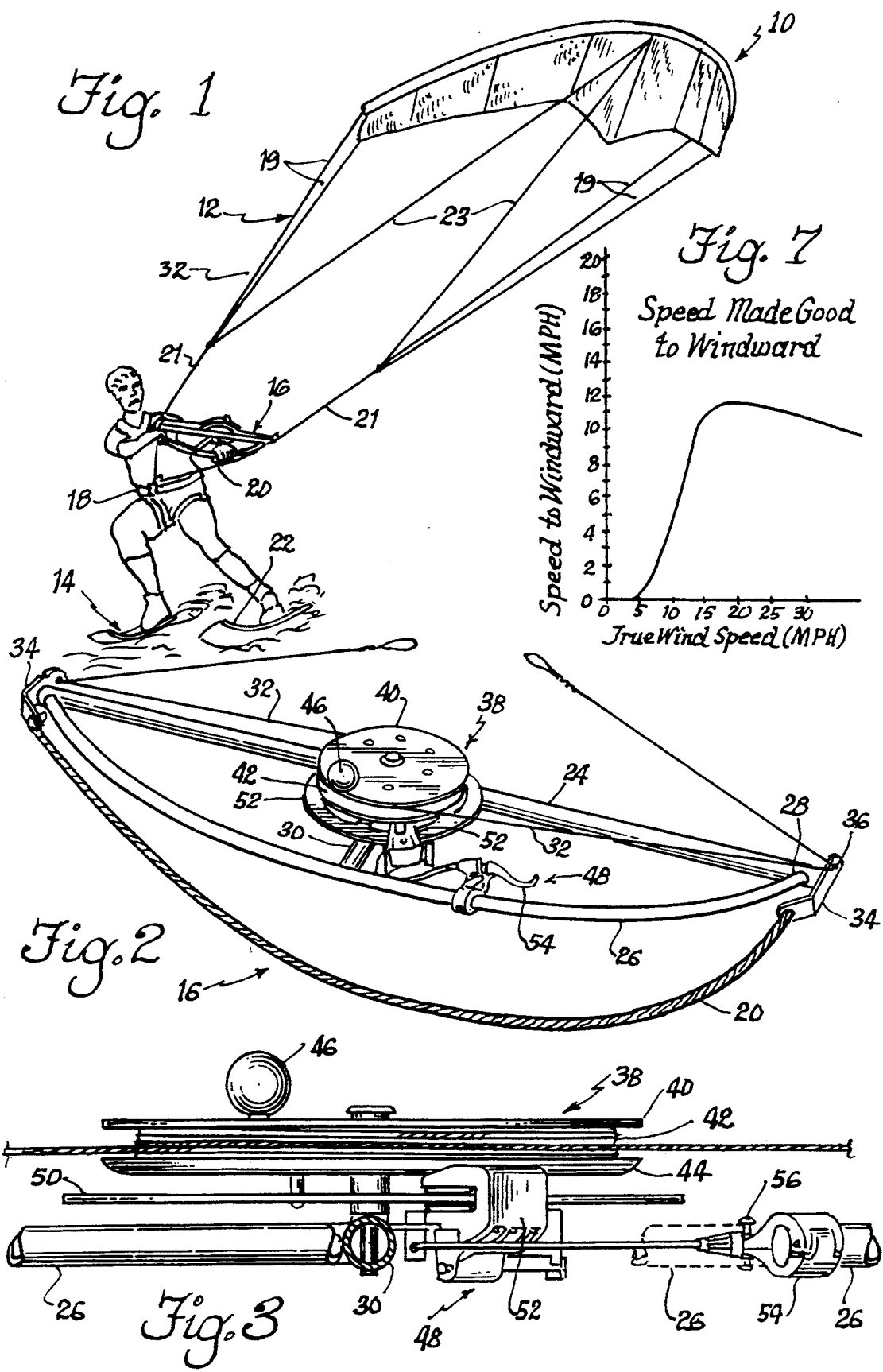

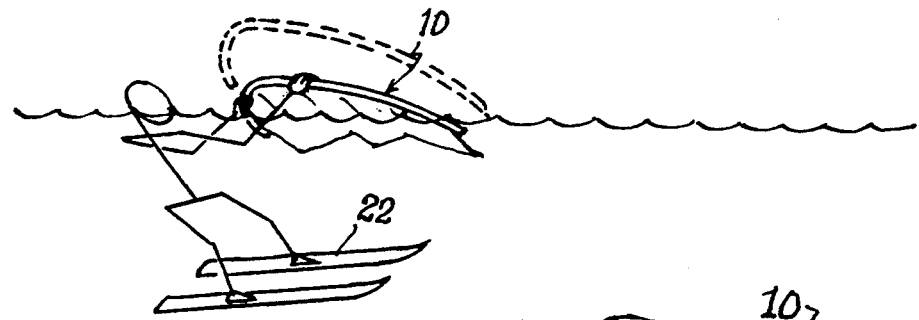
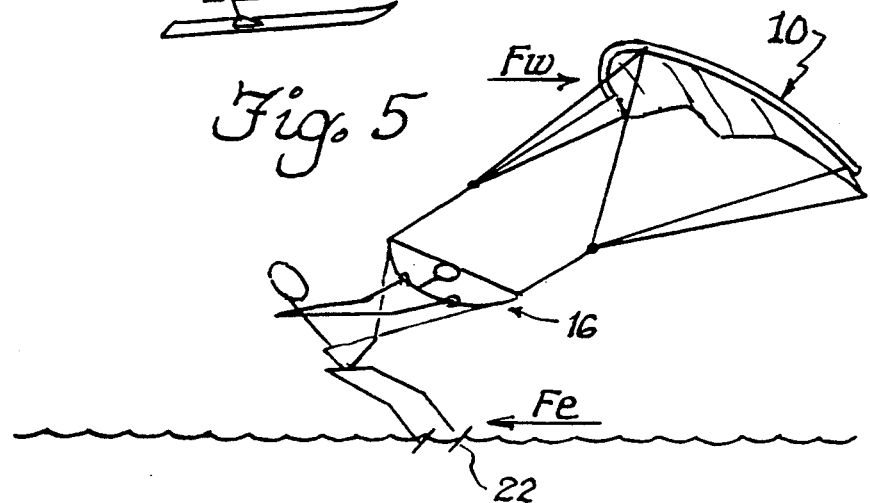
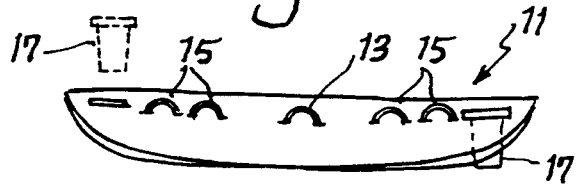
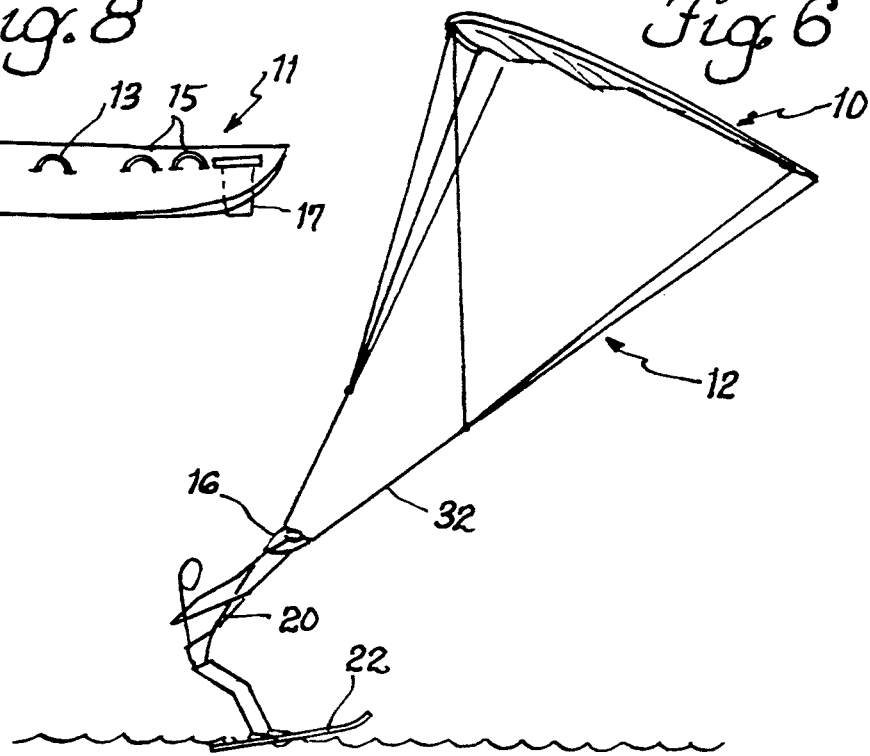

KITESKI

BACKGROUND OF THE INVENTION

The use of kites as a means for delivering a tractive force for a vessel is believed to go back at least as far as the Egyptian Pharaohs. Referring to such use of a kite with a watercraft such as water skis or a hull craft, there are advantages to a kite as opposed to a sail which is mounted on a fixed mast.

The most important advantage is the elimination of the capsizing moment that the mast exerts on the vessel. In the design of sail boats, in the end the speed limiting factor is always sail area, which if pushed to the limits makes for really exciting sailing as the large sail means the boat is pushed close to a capsizing heel in strong winds. Even in an adequately weighted keel boat, with large sails deployed when the crew is hiked out over the gunwales as far as possible to counter mast moment, the sail area maximum has been reached or exceeded. Because the center of lateral resistance is near the water level, but the tractive force must be applied considerably above the water level, there is no way to escape this moment with a conventional sailing craft.

By utilizing a kite design, the tractive force need not result in an overturning moment at all, but may be applied at any point on the craft, enabling it to be aligned accurately with the center of lateral resistance to eliminate or virtually eliminate any moment whatsoever.

Other advantages of kite use are in fact that once the kite rises to a level above 20 to 40 feet over the water, there is a substantial increase in wind velocity. Additionally, the laminar fluid flow which is conducive to efficient sailing is disrupted near the water surface, especially if it is choppy. There is turbulence in both the air and the water at the interface. As the kite rises, twenty to forty feet above the surface the turbulence diminishes markedly, providing a smoother and faster passage.

As mentioned, these facts have not escaped mankind over the centuries, and in recent times there has been some development of kite power. Particularly relating to kite skiing, there is the type involving a towboat in which the skier is towed high in the air behind the boat. This invention does not relate to that type of kite skiing.

Kite skiing independent of a tow boat has been successfully done, as evidenced by the disclosure in U.S. Pat. No. 4,708,078 issued on Nov. 24, 1987 on a PROPULSIVE WING WITH INFLATABLE ARMATURE, which illustrates an airfoil-towed skier. The focus of that patent is on the design of the inflated kite and does not go into particulars about kite skiing. The lune-like inflated armature is the essence of the invention. This kite system does not require a boat for towing power, but does rely upon an crash boat in the event he capsizes, to board the skier and his airfoil or to assist him with a re-launch. The requirement that a boat accompany the skier is a major limitation on kite skiing as a sport for obvious reasons. There is a relatively high wind requirement for practical kite surfing, and coupling that limitation with the necessity of interesting at least one other boatowner in an outing limits the number of times, as a practical matter, that a kite skier will be able to ski.

There is a need for a kite skiing system which is designed to enable the skier to launch the kite from the water without the assistance of an accompanying boat. A kite skiing system such as this, incorporating other advantageous design characteristics for ease of handling and adequate speed, would represent a significant advance in the sport of kite skiing.

SUMMARY OF THE INVENTION

The instant invention fulfills the above stated need by providing a fine-tuned kite skiing system utilizing an airfoil for the tractive element which is connected to a bridle which is tethered to a control bar held by the skier. The bar also mounts a reel which actually engages the tether lines, the reel having special means to ensure that equal lengths of the lines are reeled in and paid out to prevent the kite from assuming an uncorrectable skewered angle.

To enable water-borne launches, the airfoil has a flexed leading edge formed as an arched bow which the skier can grasp and thrust skyward to initiate the kite after being downed. Although this feature is helpful in enabling independent launches at sea, the real key to sea launching involves the use of a tether reel, both to retrieve the kite when the skier is down and to enable the tether lines to be paid out by the skier on launching to provide enough control of the airfoil at start-up to avoid re-capsizing.

Because the forces pulling the skier are in the 200 pound range, the reel is heavy duty and utilizes a disc brake operated by a hand actuator mounted on the control bar. The hand actuator has a dog or stop to lock it in the locked position once the tether has reached the appropriate effective length. The brake is used in its non-locked mode to apply a graduated drag on the line as it is reeled out on launching.

BRIEF DESCRIPTION OF THE DRAWINGS

FIG. 1 illustrates a skier on two skis being towed by the airfoil or kite;

FIG. 2 illustrates in perspective the control bar with the reel mounted thereon, and the tether lines extending out toward the airfoil;

FIG. 3 is a section taken across the bar connecting the two lengths of the control bar illustrating the brake assembly;

FIG. 4 illustrates a skier down in the water who is lofting the kite skyward for re-launch;

FIG. 5 illustrates the skier pulling out of the water and cutting laterally across the travel path;

FIG. 6 illustrates the skier in full traverse mode;

FIG. 7 is a graph which correlates the speed of the skier in the upwind direction with the wind velocity; and, FIG. 8 is a somewhat diagrammatic view of a windsurfer-style alternative embodiment in which a solid bidirectional foam hull with alternating daggerboards and footgrips is the conveyance means.

DETAILED DESCRIPTION OF THE PREFERRED EMBODIMENT

Although tricky to engineer, the invention is very simple in concept. At its simplest, it is a skier towed by a kite. The kite is actually an airfoil, and these terms are used more or less interchangeably throughout this specification despite the technical differences and each term should be read to include the other for purposes of description and claim interpretation. The wind power system utilizes an airfoil 10 which is connected through a tether means 12 to a conveyance means 14, which in the illustrated embodiment is a pair of skis supporting a skier. However, the conveyance means can be anything that will traverse over a surface, such as a single ski, a surf board, an ice boat, roller blades, a light weight mini-car or even a bicycle.

The conveyance means needs only the characteristics of being mobile over an underlying surface and having a tracking capability. The conveyance means must be able to establish a traverse vector, in the preferred line of travel, such as by skeg, keel, center board, or in the case of a wheeled vehicle, the rotational axis of the wheels which establishes orthogonally thereto a preferred direction of travel. Otherwise the user will aimlessly follow the wind and end up far downwind of the point of departure.

Although land travel is possible using the kite system, water-borne activities are currently more practical due to the high speeds achievable with the kite. Numerous styles of single-and multi-hulled vessels could use the system as well. In particular, a windsurfer-style hull, with a solid foam slab body, footgrips and a daggerboard could be used in much the same manner as skis, as diagrammatically illustrated in FIG. 8. A slalom ski/windsurfer slab hybrid with laterally oriented, snowboard-style footgrips would be practical, possibly with a double-ended alternative-deployment skeg system to permit "ambidextrous" use, so that the direction the user faces is not completely dictated by course and wind direction and configuration. This configuration is illustrated in FIG. 8, the solid hull 11 being reversible, having a central footgrip 13, two oppositely-directed footgrip pairs 15 and the alternative daggerboards 17. It is intended that the claims read to cover these variations where the context of the claim permits. For simplicity only the waterski embodiment is fully discussed in detail below.

In the embodiment shown in the figures, which is a skier being towed by the kite, the skier becomes part of a power chain, at least during part of the ride cycle. Force is delivered to the conveyance means through the skier by means of the control bar 16 which is attached to the waist shackle 18 on the torso of the user by the harness 20. The user engages the skis as well as the control bar and harness, acting as the power link between them. However, by delivering the tractive force through the body at waist level by using the shackle, the arms are free to manipulate the bar 16 for control purposes. Otherwise the skier would not stay up long, as he would be manhandling 200 pounds of tractive force in addition to the control functions necessary for a successful run.

The tether control of the airfoil is similar to kite control. Left- and right-, top- and bottom-corner bridle lines 19 converge to main tether lines 21 along with the spar-center-support lines 23 to define the entire line 32. The result is three-point airfoil support from each side of the control bar, with only a single line passing through each bar eyelet to the reel. This configuration, when used with a rigid bowed front spar and spaced battens for longitudinal stiffening, provides adequate attitude and directional stability and control for skiing. An alternative mode of control involves remote operation of air surfaces on the airfoil, through radio control or hard wire connection through the tether. Airfoil-mounted control devices with a power pack, partially automatically reacting and partially operator controlled, would add a dimension of finesse to the system, along with the design trade-offs of increased expense, complexity and the accompanying breakdown potential.

The skis 22, although having characteristics that are specially advantageous to kite skiing such as a bottom longitudinal furrow to increase tracking, are essentially conventional skis with slight modifications being possible.

The bar or bow 16 can be made of light weight aluminum capped at the ends for buoyancy, fiber glass tubes, plastic tubes, or any other material which offers maximum strength and rigidity at minimum weight. In all instances the bar would be made so that its net buoyancy is positive.

Although subject to wide variation of design, the illustrated bar has a straight length 24 and a bowed length 26, with the two lengths being joined together such as welding in the case of aluminum at the ends as indicated at 28. A short brace 30 connects the bars centrally, so that the overall arrangement of the three bars defines a planar crescent or circular sector shape. This shape is close to ideal for simplicity, strength and ease of use. The skier has the capability of adjusting the effective lengths of the right and left tether lines 32 by rotating the bow 26 roughly about its center of curvature. The harness 20 is attached at the perforated flanges 34, and the bar defines tether eyelets 36 at the ends, through which pass one or more tether lines 32 as indicated in FIG. 2. The wide separation of the two eyelets maximizes control over the airfoil.

Centrally mounted on the cross bar is the heavy duty reel 38 which extends parallel to the plane defined by the control bar. The spool 40 of the reel has a drum 42 on which the tether lines wind, and exit on opposite sides of the reel to pass through the tether eyelets 36 as shown in FIG. 2. Because the widths of the spool must be above a certain minimum in order to accommodate all of the tether lines when fully wound up, it is wide enough to make possible the irregular winding of the lines, such that one line becomes much shorter than the other, making skiing difficult and unpleasant.

To overcome this problem a line equalizing means is desirable. In the instant case, the equalizing means takes the form of a disc 44 which is dished and has a circumference extended over almost half of the height of the drum. This dished flange forces both of the lines, as they are being reeled in, to wind up together on substantially the same track, axially speaking, of the drum, and thus the same length is taken up of both lines for each single rotation. This simple expedient is more than enough for this particular application of the reel, eliminating all major off-balance airfoil situations caused by inequitable line winding.

The reel is provided with a winding knob 46 and also a brake 48 which comprises a brake disc 50 engaged by a caliper 52 controlled by a hand actuator 54. The brake actually used in production, and the one shown, are mountain bike brakes. The hand actuator has a pin or button 56 which passes through an aperture in the lever mechanism to lock the brake in engaged position. Short of full engagement the brake applies variable drag to the lines which is essential to launching. The forces exerted by the airfoil are too great to enable a controlled launching by hand, and the brake must be heavy duty. Any system that does not have a reel with controlled braking capabilities is almost certainly not one intended for use without an accompanying support boat as a wet launch would be difficult if not impossible.

It might appear that mastering kite skiing would be a difficult and athletically demanding task. It is true that it does take a certain endurance to ski for 20 or 30 minutes without a break, and upwind legs can be gruelling. However, it is estimated that the rate of mastery of kite skiing for one who already water skis is considerably better than the learning curve for a novice attempting to waterski. A novice who has had water skiing experience and stunt kite flying experience will pick up the kite skiing very quickly.

The position of attachment of the tether to the conveyance means when the latter is a boat or wheeled craft on land will work out to be the approximate point of center of lateral resistance of the vessel or vehicle. Obviously if offset from this point, or actually from this axis, undesirable moments will be experienced by the conveyance means similar to the overturning force on the sailboat, causing the tether t be re-mounted. In the event of a water skier who acts as a human force link, the tether is worked back and forth a small amount across the center-of-lateral-resistance line as needed to maintain balance and steering.

With the ability to align the tractive force with the center of lateral resistance, coupled with the advent of modern light-weight fabrics, a large sail may be maintained aloft which need only pull a single skier rather than an entire boat. The skier can thus go quite fast. One of the inventors was a participant in speed trials for competition wind surfers and was able to steadily pass all of them to set a new course record. He was moving at 40 knots or better. Speeds of 40 knots are readily achieved and there are firm grounds for believing that speeds substantially in excess of 50 knots are achievable with a kiteski.

The chart of FIG. 7 illustrates not the overall speed of the skier, but rather the speed upwind at various wind levels. It may be important for a kite skier to know this inasmuch as he or she may be required to tack upwind for a considerable time to get back to the starting point. It would be good to know on a relative scale the difficulty of the return trip under given wind conditions so that the skier may guide his jubilant broad reach departure accordingly, as he is being rapidly propelled increasingly further downwind of his point of departure.

It is hereby claimed:

1. A high performance, high lift wind powered system operative in wind conditions of wind speed between 15 and at least on the order of 35 to 40 knots whereby tractive force from an airfoil is harnessed to draw a conveyance means over an underlying surface, comprising:
   (a) an airfoil;
   (b) a conveyance means for traversing across said surface and having tracker means for establishing a preferred linear traverse vector;
   (c) tether means operatively connected between said conveyance means and said airfoil to deliver tractive force from said airfoil to said conveyance means and to provide control means for said airfoil from said conveyance means;
   (d) dynamic tether length control means comprising a reel capable of withstanding tensile force on said tether of at least 150 lbs operative with said tether means to adjust the length thereof while said system is in use; and,
   (e) said tether means including steering means operable substantially independently of said reel such that said reel can be operated to pay out and reel in said tether means while said conveyance means is in controlled operation traversing a surface.

2. Structure according to claim 1 wherein said tether means comprises a plurality of individual lines attached to said airfoil and engaged by said reel, and said steering means comprises a control bar, at least three feet long and being capable of withstanding a combined pull on both ends of at least 150 pounds, operative from said conveyance means and mounting said reel thereon, said control bar defining a pair of spaced eyelets at the ends thereof, and at least two of said lines passing from said reel out through respective ones of said eyelets and connecting to opposite sides of said airfoil to establish a wide control stance over said airfoil.

3. Structure according to claim 2 wherein said reel has a winding drum on which said at least two lines are engaged and from which same diverge to the respective eyelets, and including means to ensure said at least two lines reel in and pay out in substantially equal lengths as said reel is operated.

4. Structure according to claim 3 wherein said means to ensure comprises a dished flange disc coaxial with said drum which arches from one end of said drum toward the other end thereof defining a circumferential edge substantially axially centrally thereof to cause said at least two lines to wind on substantially the same axial track on said drum and thus wind in equal lengths.

5. Structure according to claim 2 wherein said at least two lines each split into bridle lines in the proximity of said airfoil, said bridle lines being attaching to the left and right edges of the airfoil.

6. Structure according to claim 5 wherein said bar comprises a straight length and a bow length, said lengths being joined together at the ends thereof to define a planar, substantially circular sector, and having a central connecting brace between said lengths.

7. Structure according to claim 5 wherein said conveyance means supports a user in use, and said tether means is connected to said conveyance means through a user, wherein said user engages both said conveyance means and said tether means to act as a power chain connecting link.

8. Structure according to claim 7 wherein and including a harness for said bar and means for attaching same to the torso of said user such that tractive force is delivered straight to the body of the user such that the user's arms are free to operate the bar to control said airfoil substantially free of the tension of the tractive force delivered through the tether means by said airfoil.

9. Structure according to claim 2 wherein said reel has a drum-defining spool upon which said tether means is engaged, and including a brake and brake control means capable of exerting a braking force on said tether means of at least 100 pounds to slow or stop the rotation of said drum in use, whereby said tether means can be paid out and reeled in a controlled manner while said wind powered system is in operation.

10. Structure according to claim 9 wherein said brake comprises a brake disc mounted coaxially and non-rotationally relative to said spool, and a brake caliper mounted on said bar operative with said disc.

11. Structure according to claim 10 wherein said brake control means comprises a hand brake actuator mounted on said bar.

12. Structure according to claim 11 and including a brake lock to lock said brake in braking position to establish the effective length of said tether means.

13. Structure according to claim 1 and including a control bar connected to said tether means, and said airfoil, conveyance means, tether means and control bar are all of positive buoyancy, having a net specific gravity less than 1.

14. Structure according to claim 13 wherein said airfoil is crescent-shaped with an arcuate leading edge spar to facilitate launching said airfoil from the water.

15. A wind-propelled apparatus for towing a user across a surface which comprises:
 (a) A high-performance airfoil having a lift-to-drag ratio of on the order of 1 to 4 for generating a towing force;
 (b) a tether having a first and a second end, said first end being attached to said airfoil and said second end being attachable to the user for control of said airfoil by the user as the user is towed across the surface by the towing force generated by said airfoil;
 (c) steering means and a braked reel connected to said tether to respectively steer and reel said tether in and out, and being capable of withstanding tensile forces on said tether exceeding 150 pounds to permit reeling and steering independently of one another while said apparatus is in use; and,
 (c) conveyance means attachable to the user to allow the user to slide on the surface as the user is being towed by the towing force generated by said airfoil.

16. An apparatus as recited in claim 15 wherein said airfoil is a high performance kite and said conveyance means is a pair of skis.

17. An apparatus as recited in claim 15 wherein said tether comprises:
 (a) a plurality of lines, each said line being individually attachable to said airfoil;
 (b) a control bar attachable to the user; and,
 (c) a rotatable reel mechanism mounted on said control bar, said reel mechanism being connected with said plurality of lines for winding up or paying out said plurality of lines, said reel mechanism including a dish-shaped member for guiding said plurality of lines into leveled placement on said reel mechanism when winding up said plurality of lines.

18. A system for towing a person across a wind swept water surface which comprises:
 (a) gliding means disposed on the water surface, said gliding means including means engageable with the person to support the person on said gliding means;
 (b) means for interacting with the wind to generate an aerodynamic force;
 (c) means attachable to the person and to said wind interacting means for towing the person across the water surface on said gliding means in response to said aerodynamic force; and,
 (d) control means operable by said person while engaged on said gliding means to alter the attitude of said means for interacting as well as the effective length of said means attachable to the person.

* * * * *